United States Patent [19]
Gubin

[11] Patent Number: 4,951,514
[45] Date of Patent: Aug. 28, 1990

[54] DUAL GYROSCOPIC STABILIZER

[75] Inventor: Daniel Gubin, P.O. Box 159, Coosada, Ala. 36020

[73] Assignee: Daniel Gubin, Coosada, Ala.

[21] Appl. No.: 242,423

[22] Filed: Sep. 9, 1988

[51] Int. Cl.$^5$ ............................................. G01C 19/08
[52] U.S. Cl. ........................................ 74/5.37; 74/5 R
[58] Field of Search .................... 74/5.37, 5.7, 5 R; 310/115, 116, 123; 318/320; 290/29, 39, 49

[56] References Cited

U.S. PATENT DOCUMENTS

| | | | |
|---|---|---|---|
| 3,252,023 | 5/1966 | Schmidt | 310/115 |
| 3,490,297 | 1/1970 | Brodersen | 75/5 R |
| 3,831,049 | 8/1974 | Korotenko et al. | 310/115 X |
| 4,237,395 | 12/1980 | Loudermilk | 310/115 X |
| 4,644,206 | 2/1987 | Smith | 310/115 |

FOREIGN PATENT DOCUMENTS 0678422 8/1979 U.S.S.R. ................................ 74/5.37

Primary Examiner—Rodney H. Bonck

[57] ABSTRACT

The present invention relates to a gyroscopic stabilizer consisting of two interlocking wheels which comprise the field and armature of a synchronous electric motor. The wheels of equal mass and moments of inertia revolve about a common stationary shaft in opposite directions at the same rate of speed. The wheels interlock so that they may revolve relative to each other, but all other motion of one wheel relative to the other is prevented. The total angular momentum of the system is zero. In case of sudden destructive deceleration, no angular momentum is transferred to the stabilized object. Gyroscopic action of the wheels is maximized, and the nongyroscopic mass of the mechanism is minimized.

3 Claims, 1 Drawing Sheet

DUAL GYROSCOPIC STABILIZER

TECHNICAL FIELD

The present invention relates to a new type of gyroscope which may serve to stabilize a moving object such as a motor car, camera, gun, spacecraft, or human subject to imbalance. It may also serve as a reference for an automatic control apparatus. A simple gyroscope consisting of a spinning wheel has four limitations. First in the case of destructive deceleration (a wreck), the sudden immobilization of the spinning wheel would cause the angular momentum of the wheel to be transferred to the entire apparatus, thereby causing the entire apparatus to spin, and thus possibly worsening the damage that might otherwise occur. Second a torque on the spinning wheel which causes a precessional motion in a direction perpendicular to the torque may interfere with stability and be inconvenient regarding stabilization. Third the weight of the driving apparatus provides no useful purpose besides its motive function. Fourth a means of transmitting power to the gyroscope must be provided. This invention overcomes these four limitations in the use of gyroscopic stabilization. Note is hereby made of Disclosure Document No. 156101 filed on Sept. 18, 1986.

BACKGROUND OF THE INVENTION

The stabilizing effect of a spinning mass, a gyroscope, is well known. The rotor of an electric motor may be considered a simple gyroscope. Its design rarely maximizes the gyroscopic effect and the corresponding stator is not spinning at all. The present invention consists of a specially designed electric motor in which almost all of the mass of the motor spins, half in one direction and the other half in the opposite direction. The moment of inertia of each half is the same and is maximized to increase the gyroscopic effect per unit of mass. Furthermore, the two spinning masses are locked together. They are free to rotate, but no other motion of one independent of the other is permitted.

BRIEF DESCRIPTION OF THE INVENTION

Two interlocking wheels of identical mass and identical moments of inertia are made to spin in opposite directions about a central immobile shaft. The interlocking device permits the wheels to spin freely, however, any other motion of one wheel independent of the other is opposed. The total angular momentum of the system is zero. In the event of sudden destructive deceleration, the angular momentum of each wheel is countered by the equal and opposite angular momentum of the other wheel imparting none to the surrounding support assembly.

The wheels are so constructed that one acts as the armature and the other as the field of an electric motor. However, since the armature wheel and the field wheel are each equally free to rotate, the torque that is created by energizing the magnetic fields serves to rotate both wheels in opposite directions. The type of motor is best described as a synchronous electric motor with certain special features. The field wheel receives direct current through brushes resting on slip rings. The armature wheel also receives direct current through brushes, but there is a method of repeatedly switching the direction in which the current flows, producing in effect alternating current in the armature wheel. The frequency of the alternating current created is directly related to the relative angular velocity of the wheels. As the wheels spin faster in opposite directions, the frequency of the alternating current increases proportionally. The increasing frequency provides the basis for the starting torque which is generally absent in a constant frequency synchronous motor. The torque between the wheels varies as the position of the wheels relative to each other varies. As the magnetic poles on one wheel come into alignment with the poles on the other wheel, North to South, the torque drops to zero. The two wheels are carried past the point of zero torque by their momentum. Without an alternation in the current, the wheels would then face a decelerating torque. However, the switching device causes the direction of the current in the armature wheel to alternate as the point of zero torque is reached. Then instead of a decelerating torque, there is a continuation of the accelerating torque.

Against ever faster rotation of the wheels are the forces of friction in the bearings, the resistance of the air against the rotating wheels, the time for the switching device to act, and the time for the ferromagnetic material to switch direction of the magnetic field. The switching device may be sectional rings connected so as to produce the desired effect (essentially a commutator) or a relay or similarly acting electronic device activated by a photocell or another type of proximity switch.

Since both wheels possess equal amounts of angular momentum but are rotating in opposite directions, the precessional motion of one wheel due to an outside torque is off set by the precessional motion of the other wheel reacting to the same outside torque. Also almost all of the mass of the machine is rotating minimizing unnecessary weight. Additionally, the motor is the gyroscope. This avoids the necessity of transmitting the power of the motor to the gyroscope.

It is an object of this invention to provide a gyroscope that will not impart angular momentum to a surrounding apparatus in the event of a destructive deceleration.

Another object of this invention is to provide a gyroscope in which the gyroscopic effect per unit of mass is maximized.

A further object of this invention is to provide a gyroscope which does not require a transmission to transmit power from a motor to the gyroscope.

To attain these and other objects, the present invention provides two interlocking wheels which comprise the field and armature of a synchronous electric motor. The wheels of equal mass and moments of inertia revolve about a common stationary shaft in opposite directions at the same rate of speed. The wheels interlock so that they may revolve relative to each other, but all other motion of one wheel relative to the other is opposed. The total angular momentum of the system is zero. Gyroscopic action of the wheels is maximized, and the nongyroscopic mass of the mechanism is minimized.

DETAILED DESCRIPTION

Figure 1:
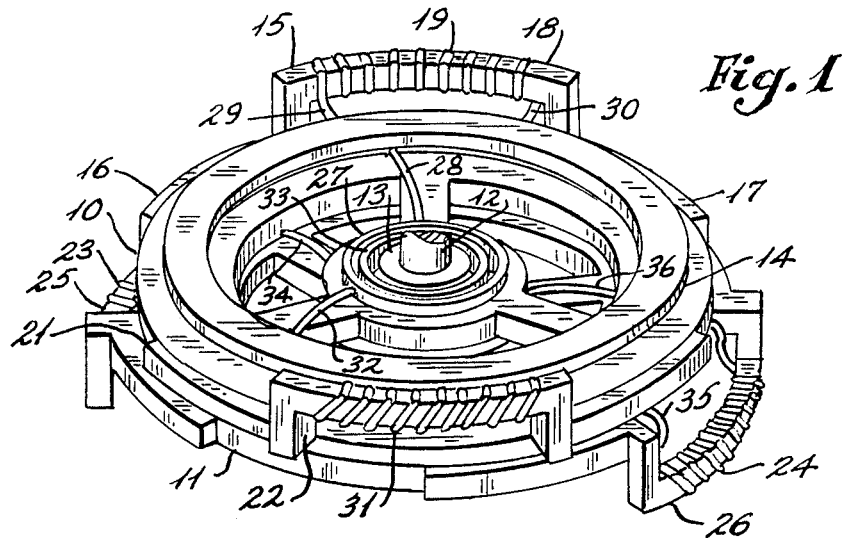
FIG. 1 shows the two wheels without the surrounding support frame.

FIG. 1 shows wheels 10 and 11 in position about shaft 12. Shaft 12 is fixed relative to an external framework or to the object that is to be stabilized. Shaft 12 does not rotate. Radial thrust bearings such as 13 are provided to permit the rotation of wheels 10 and 11 relative to each other and relative to the external framework or containing object. In the preferred design each wheel should be of identical construction so that the moments of inertia of each wheel are likewise identical. Nonferromagnetic material should be used to avoid unwanted magnetic pathways.

Attached to each wheel 10 and 11 or as an integral part of each wheel are interlocking units 14. The interlocking unit 14 that is visible in FIG. 1 does not interlock with anything but is provided as part of wheel 10 so that the moments of inertia of wheels 10 and 11 remain identical. An identical unit like unit 14 is provided on wheel 11 as will be seen in FIG. 2 and interlocks with wheel 10. The interlocking of one wheel with the other is such that the wheels may rotate relative to each other about shaft 12, but other motion of one wheel relative to the other is opposed by the interlocking units. Assembly of the interlocking aspects of the wheels will generally be performed after the wheels are in place relative to each other, otherwise the method of moving the wheels to interlock could be reversed to disengage the interlocking parts.

Each wheel is provided with the same number, one or more, ferromagnetic assemblies such as 15, each consisting of two poles 16 and 17, and a central section 18, about which is wrapped an insulated coil such as 19 for the conduction of electrical current and the creation of a magnetic field. If only one ferromagnetic assembly is provided for each wheel, then special care should be exercised to maintain the correct balance of each wheel. The angular span of each pole 16 and 17 equals the angular span of the central section 18 and equals the angular span between the end 20 of one pole and the end 21 of the pole on the next ferromagnetic assembly 22. The angular span of all ferromagnetic assemblies is the same. The angular span of each ferromagnetic assembly may be divided into four equal sections, namely, one pole, the central section, the second pole, and the space to the next assembly on the same wheel. The central sections such as 18 of the ferromagnetic assemblies on wheel 10 are placed so that they may be wound with coils such as 19 and yet not interfere with the coils 23 and 24 wound on the central sections of the ferromagnetic assemblies 25 and 26 on wheel 11.

For descriptive convenience, the position when the central sections of the assemblies on one wheel are in line with the central sections of the assemblies on the other wheel shall be termed the zero position. The position in which the central sections of the assemblies on one wheel are in line with the interpole spaces on the other wheel shall be termed the antizero position. As drawn in FIG. 1, the wheels may be considered to have rotated either a total of approximately 67 degrees or a total of approximately 113 degrees from the zero position, depending on the direction of rotation. Each wheel would normally have rotated half the total angular distance. As drawn with two rim assemblies per wheel, each pole such as 16 or 17 and each central section such as 18 and each interpole space such as the interpole space between pole ends 20 and 21 measures 45 degrees in angular span and the total angular distance from the zero position to the antizero position is 90 degrees. The angular span of each pole is termed the pole span. For one ferromagnetic assembly per wheel, the pole span is 90 degrees and the angular distance between the zero position and the antizero position is a total of 180 degrees. For three assemblies per wheel, the pole span is 30 degrees and the angular distance between the zero position and the antizero position is 60 degrees. In general the pole span is found by dividing 90 degrees by the number of ferromagnetic assemblies per wheel. The total angular distance from the zero to the antizero position is twice the pole span.

Direct current reaches coil 19 from slip ring 27 via insulated wire 28 which continues as insulated wire 29 after passage through interlocking unit 14. The brushes which are bring electric current from an external source of power and which ride on the slip rings such as 27 are not shown in FIG. 1. The other end of coil 19, namely wire 30, is connected to coil 31 and then from the other end of coil 31 by means of wire 32 through slip ring 27 to slip ring 33 and then to the external source by means of a brush that contacts slip ring 33 as it rotates with wheel 10. Alternatively, direct current may be supplied by a battery attached to wheel 10 avoiding the use of slip rings and brushes.

The direction of current flow is such that the poles carried by wheel 10 alternate one North, the next South and so on around the wheel. The direction of current flow is unchanging, as is the magnetic polarity of each pole carried by wheel 10. Current reaches coils 23 and 24 on wheel 11 in a different manner to be described below. On wheel 11 the poles alternate polarity as they do on wheel 10 but the direction of the current flowing in coils 23 and 24 is switched at opportune times. The switching of the direction of the current and thus the magnetic polarity of the poles provides a continuous torque on the wheels.

In the beginning, with both wheels 10 and 11 at rest, electric current in coils 19 and 31 of wheel 10 and coils 23 and 24 of wheel 11 cause half the poles of each wheel to act as North magnetic poles alternating with the other half acting as South magnetic poles. The North magnetic poles of wheel 10 attract the South magnetic poles of wheel 11 and repel the North magnetic poles of wheel 11. The South magnetic poles of wheel 10 attract the North magnetic poles of wheel 11 and repel the South magnetic poles of wheel 11. The net effect is that whatever the original direction of current flow through coils 23 and 24 on wheel 11, there will be a torque between the two wheels 10 and 11 causing them to rotate in opposite directions until the North poles of wheel 10 are aligned with the South poles of wheel 11 and the South poles of wheel 10 are aligned with the North poles of wheel 11. When the wheels are so aligned the torque between them will be zero. This condition of alignment is obtained either in the zero position or in the antizero position depending on the initial directions of the electric current flowing in the coils of each wheel. If the direction of the flow of current in the coils of wheel 11 were not alternated, any overshooting of this alignment position due to the angular momentum of the wheels would be opposed by a torque in the direction opposite to the direction of the original torque. To obtain a torque acting in the same direction as the original torque and to cause the wheels to continue to rotate as they had initially, the direction of current in coils 23 and 24 on wheel 11 is switched, thereby switching the magnetic polarity of the poles on wheel 11 and thus causing further rotation of each wheel in the same directions as first manifest.

The switching of the direction of the current in coils 23 and 24 of wheel 11 at the moment of alignment of the poles may be obtained by various methods. Segmented slip rings may be used on the top of wheel 11 in conjuction with brushes on the underside of wheel 10. The brushes bring the electric current to the commutator-like device on wheel 11 which serves to alternate the direction of current in the coils at the correct moment of alignment. Another method to secure the alternation of the current in the coils of wheel 11 at the opportune moment is to bring direct current to slip rings on wheel 11. The brushes needed to achieve this may reach wheel 11 either from the support structure as is done for the brushes in contact with the slip rings on wheel 10 or from the underside of wheel 10 as described above. Instead of segmenting the rings, the electric current may be alternated by a relay or similar electronic device which is activated by a switch which is sensitive to the relative positions of the two wheels 10 and 11. Examples of such position sensitive switches are magnetic proximity switches and photocell activated switches. However the current is switched back and forth in terms of polarity, insulated wire 34 serves to deliver the current to coil 23. Insulated wire 35 brings the current from coil 23 to coil 24 and insulated wire 36 returns the current to the switching device employed.

Figure 2:
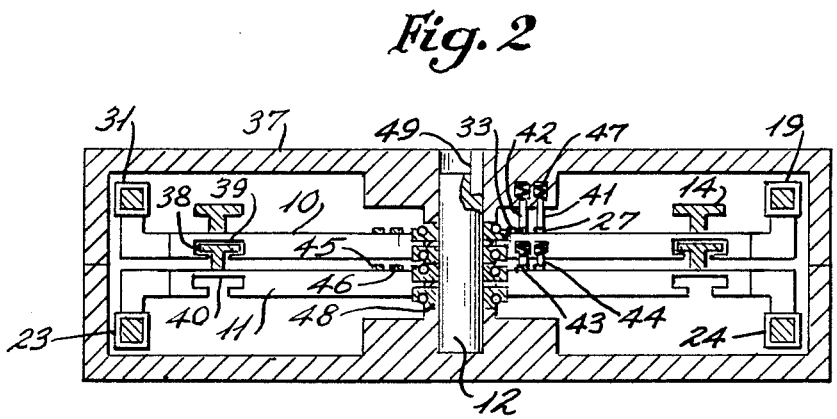
FIG. 2 is a cross sectional view of the entire assembly.

FIG. 2 shows the apparatus in cross section with the surrounding framework 37. The interlocking unit 38 on wheel 11 is seen as is the mating part 39 on wheel 10. A part identical to the mating part 39 on wheel 10 is shown as 40 on the underside of wheel 11 even though there is nothing there with which to interlock. Its repetition there is to maintain the equivalence of the moments of inertia of the two wheels. Many different designs are feasable to provide for the interlocking of the wheels.

Brushes 41 and 42 bring current to slip rings 27 and 33 respectively on wheel 10. On the underside of wheel 10 are brushes 43 and 44 which are in electrical continuity with slip rings 27 and 33 respectively. These brushes 43 and 44 bring current to the segmented rings 45 and 46 respectively on wheel 11. If a switching device other than segmented rings are used, then rings 45 and 46 would be solid rather than segmented. Current flows from one of these rings, say 45 to the coils 23 and 24 on wheel 11 before returning to the other ring, in this case 46. As wheel 11 moves relative to wheel 10, brushes 43 and 44 contact different segments of rings 45 and 46 respectively, causing the direction of the current flowing through coils 23 and 24 to reverse direction. Brush springs such as 47 are utilized to help maintain electrical contact between the brushes and their respective rings.

The arrangement of radial thrust bearings such as 48 is apparent. Also visible is pin 49 which holds shaft 12 fixed to the enveloping framework 37.

Several obvious refinements of the system include the evacuation of the air within framework 37 to reduce friction with the air. The spinning wheels 10 and 11 may even carry the impellers of such a vacuum pump. Another refinement may include a tachometer and brake feedback system wherein any increase in the speed of one wheel relative to the other because of differences in bearing friction or other cause brings about the application of the brakes on the overspeeding wheel.

Figure 3:
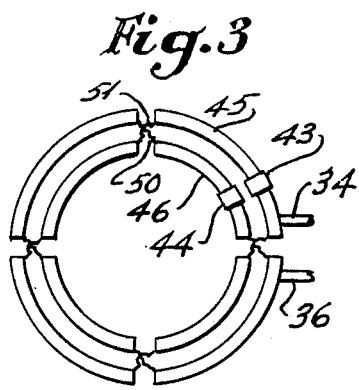
FIG. 3 is a top view of sectional rings that may be used to create alternating current in the armature wheel.

FIG. 3 is a top view of segmented rings 45 and 46. Brushes 43 and 44 are also drawn. The number of segmentations on each segmented ring should equal the number of poles that are present on each wheel. For each revolution of wheel 11 relative to the supporting framework 37, the poles on wheel 11 will be switched by twice the number of segmentations that there are on each segmented ring. This apparent doubling of the rate at which the poles on wheel 11 are switched reflects the angular rate of motion of brushes 43 and 44 moving in one direction as wheel 10 rotates and the angular rate of motion of segmented rings 45 and 46 moving in the opposite direction as wheel 11 rotates. Alternate segments of ring 45 are in electrical continuity with non-adjacent alternate segments of ring 46 by insulated conductors such as 50. Similarly, the remaining segments of both rings are in electrical continuity by means of insulated conductors such as 51. Each segment of rings 45 and 46 thus is in electrical continuity with half of the segments and in electrical isolation from the other half. Each segment is in electrical isolation from adjacent segments on the same ring as well as the adjacent segment on the neighboring ring. Insulated conductors 34 and 36 are each in electrical continuity with one half of the segments of rings 45 and 46. As drawn, brush 43 is in electrical continuity with conductor 34 and brush 44 is in electrical continuity with conductor 36. These conductors 34 and 36 serve to bring current to and from coils 23 and 24 on wheel 11.

Figure 4:
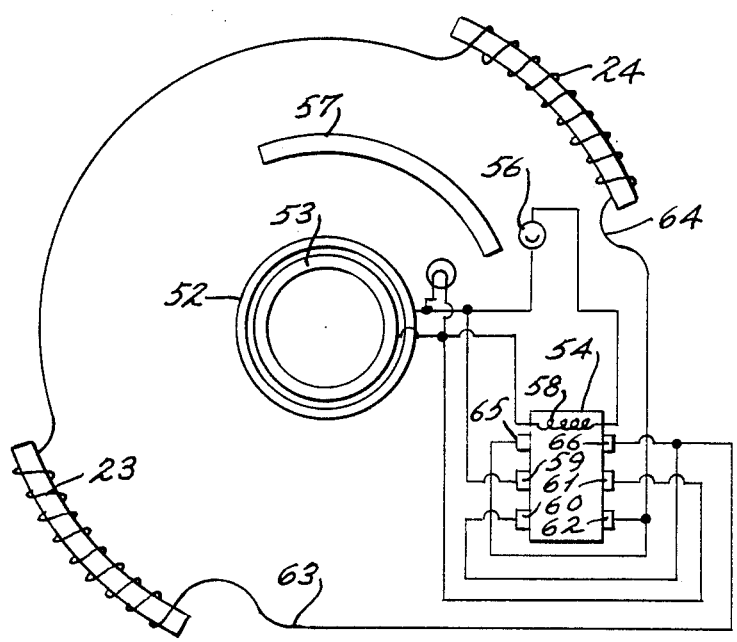
FIG. 4 is a schematic drawing of a switching device that may be used to the same purpose.

FIG. 4 is a schematic representation of a switching device that may be used in place of segmented rings 45 and 46. Direct current is supplied either by a battery carried on wheel 11 or by slip rings 52 and 53 on wheel 11 in contact with brushes either on wheel 10 or support structure 37. This direct current is made to alternate by means of relay 54 at the moment the poles of wheels 10 and 11 are in alignment. A method by which this is caused includes a lamp 55 which in electrical continuity between slip rings 52 and 53 shines. Photocell 56 has a high resistance to the flow of electricity when no light strikes its surface and has a low resistance when light does strike its surface. The light from lamp 55 to photocell 56 is interrupted intermittantly by barrier 57 which is carried about by wheel 10. There are half as many barriers such as 57 on wheel 10 as there are poles on the same wheel. Barrier 57 has an angular span equal to two pole spans or in this instance 90 degrees. There is a space equal in angular span to barrier 57 on either side of it so that there is barrier, space, barrier, space alternating around wheel 10. As wheel 10 spins, a barrier is brought between lamp 55 and photocell 56 followed temporally by empty space. This action causes a current to flow through photocell 56 intermittantly. A circuit from the source of power through photocell 56 is continued in series through coil 58 of relay 54 or its electronic equivalent. Contact 59 is held in contact with contact 60 by a spring, and similarly contact 61 is held in contact with contact 62 by a spring. When barrier 57 is present between lamp 55 and photocell 56, photocell 56 presents a high resistance to current flow and essentially no current flows through coil 58 of relay 54. Assuming the electric potential between rings 52 and 53 is such that current would flow from ring 52 to ring 53, then the current flows from ring 52 to contact 59 and thence to contact 60 and thence to coils 23 and 24. The current flows in coils 23 and 24 in the direction from end 63 to end 64. Current flows to contact 62 and thence to contact 61 and to ring 53. When barrier 57 moves out of the space between lamp 55 and photocell 56 allowing light to shine upon photocell 56, the resistance in photocell 56 drops. This permits current to flow through photocell 56 and thence through coil 58 of relay 54. The current through coil 58 "activates" the relay causing the separation of contact 59 from 60 and of contact 61 from 62. Contact 59 now contacts contact 65, and contact 61 now contacts contact 66. The current from ring 52 to contact 59 now flows to contact 65 and thence to end 64 of coils 24 and 23 to end 63 to contact 66 to contact 61 and thence to ring 53. Thus the action of barrier 57 as it is carried about by wheel 10 causes the current in coils 23 and 24 to flow first one way and then the other. This reversal of the direction of the current flow causes a reversal of magnetic flux in the poles carried by wheel 11. This reversal of flux in the poles just as the torque is approaching zero causes a renewal of the torque to continue the wheels spinning.

The above description shall not be construed as limiting the ways in which this invention may be practice but shall be inclusive of many other variations that do not depart from the broad interest and intent of this invention.

I claim:

1. A gyroscope consisting of two gyroscopic wheels comprising the armature and field of a synchronous electric motor, each free to rotate about a fixed shaft.

2. The apparatus described in claim 1 utilizing segmented rings to create alternating current, the frequency of the current varying as the angular velocity of the wheels one relative to the other varies.

3. The apparatus described in claim 1 surrounded by an enclosing structure from which the air is removed permitting rotation of the gyroscopic wheels without the encumberance of air resistance.

* * * * *